United States Patent
Caldas et al.

(10) Patent No.: US 10,422,653 B2
(45) Date of Patent: Sep. 24, 2019

(54) CREATING ROUTE BASED ON IMAGE ANALYSIS OR REASONING

(71) Applicant: International Business Machines Corporation, Armonk, NY (US)

(72) Inventors: Fabrizio Nascimento Caldas, Sumare (BR); Argemiro José de Lima, São Paulo (BR); Joaquim Siqueira de Mattos, Campinas (BR); Leonardo José da Costa Gonzales, Hortolandia (BR); Guilherme Segantin Viteri, Santo Andre (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/892,830

(22) Filed: Feb. 9, 2018

(65) Prior Publication Data
US 2018/0172466 A1 Jun. 21, 2018

Related U.S. Application Data

(63) Continuation of application No. 15/625,456, filed on Jun. 16, 2017, now Pat. No. 9,921,074, which is a (Continued)

(51) Int. Cl.
*G01C 21/36* (2006.01)
*G01C 21/34* (2006.01)

(52) U.S. Cl.
CPC ..... *G01C 21/3602* (2013.01); *G01C 21/3461* (2013.01); *G01C 21/3484* (2013.01); *G01C 21/3492* (2013.01)

(58) Field of Classification Search
CPC .................................................. G01C 21/3602
See application file for complete search history.

(56) References Cited

U.S. PATENT DOCUMENTS

| 5,610,815 A | 3/1997 | Gudat et al. |
| 7,483,786 B1 | 1/2009 | Sidoti et al. |

(Continued)

FOREIGN PATENT DOCUMENTS

WO  WO2011/053338 A1  5/2011

OTHER PUBLICATIONS

Anonymous, "System and method for utilising citizen sensing to provide route planning for people with disabilities", IP.com, IPCOM/000235672, Mar. 19, 2014, pp. 1-3.

(Continued)

*Primary Examiner* — Alex C Dunn
(74) *Attorney, Agent, or Firm* — Scully, Scott, Murphy & Presser, P.C.; Scott Dobson, Esq.

(57) ABSTRACT

A method, system and computer program product for creating a route are disclosed. In embodiments, the method comprises identifying a start location and a destination for a user; identifying defined needs of the user; obtaining satellite imagery of a specified area between the start location and the destination. The satellite imagery is analyzed to identify defined local features affecting the defined needs of the user in the specified area; and a route is selected for the user, from the start location to the destination, based on the defined local features in the specified area. In embodiments, selecting the route includes identifying a plurality of candidate routes from the start location to the destination; generating a score for each of the candidate routes using the defined local features, and selecting one of the candidate routes based on the generated scores for the candidate routes.

20 Claims, 4 Drawing Sheets

Related U.S. Application Data continuation of application No. 15/048,046, filed on Feb. 19, 2016, now Pat. No. 9,702,717.

(56) References Cited

U.S. PATENT DOCUMENTS

| | | | | |
|---|---|---|---|---|
| 8,131,118 B1* | 3/2012 | Jing | ................ | G01C 21/20 382/305 |
| 8,385,946 B2 | 2/2013 | Forstall et al. | | |
| 8,391,615 B2 | 3/2013 | Wu et al. | | |
| 8,478,521 B2 | 7/2013 | Min et al. | | |
| 8,589,069 B1* | 11/2013 | Lehman | ................ | G01C 21/20 340/995.1 |
| 8,880,345 B2 | 11/2014 | Kazama et al. | | |
| 2002/0077749 A1* | 6/2002 | Doi | ................ | G01C 21/20 701/433 |
| 2002/0120398 A1* | 8/2002 | Matsuda | ................ | G01C 21/20 701/433 |
| 2002/0120622 A1* | 8/2002 | Hasegawa | ................ | G01C 21/20 |
| 2005/0075119 A1 | 4/2005 | Sheha et al. | | |
| 2008/0293430 A1* | 11/2008 | Blom | ................ | G01C 21/3484 455/456.1 |
| 2010/0023249 A1* | 1/2010 | Mays | ................ | G01C 21/20 701/532 |
| 2010/0036599 A1* | 2/2010 | Froeberg | ................ | G01C 21/3461 701/532 |
| 2010/0205060 A1* | 8/2010 | Athsani | ................ | G01C 21/3484 705/14.58 |
| 2010/0268450 A1 | 10/2010 | Evanitsky | | |
| 2011/0054779 A1 | 3/2011 | Kim et al. | | |
| 2011/0153193 A1* | 6/2011 | Fox | ................ | G01C 21/20 701/533 |
| 2012/0271864 A1 | 10/2012 | Morlock | | |
| 2013/0006521 A1 | 1/2013 | Needham et al. | | |
| 2013/0285855 A1* | 10/2013 | Dupray | ................ | G01S 19/48 342/451 |
| 2014/0032100 A1 | 1/2014 | Park et al. | | |
| 2015/0198440 A1* | 7/2015 | Pearlman | ................ | G01S 17/023 356/4.01 |

OTHER PUBLICATIONS

Le et al., "Pedestrian Lane Detection for the Visually Impaired", Digital Image Computing Techniques and Applications (DICTA), 2012 International Conference on, Dec. 3-5, 2012, http://ieeexplore.ieee.org/xpl/articleDetails.jsp?tp=&arnumber=6411701&queryText%25, pp. 1-6.

Bhatia et al., "Network Assisted Safe Navigation for the Visually Challenged Pedestrians", IP.com, IPCOM/000240600, Feb. 11, 2015, pp. 1-16.

Senlet et al., "Segmentation of Occluded Sidewalks in Satellite Images", 21st International Conference on Pattern Recognition (ICPR 2012), Nov. 11-15, 2012, Tsukuba, Japan, pp. 805-808.

Niaraki et al., "Ontology based personalized route planning system using a multi-criteria decision making approach", Expert Systems with Applications, vol. 36, Issue 2, Part 1, Mar. 2009, pp. 2250-2259 (Abstract only).

List of IBM Patents or Patent Applications Treated as Related.

* cited by examiner

CREATING ROUTE BASED ON IMAGE ANALYSIS OR REASONING

CROSS REFERENCE TO RELATED APPLICATION

This application is a continuation of copending patent application Ser. No. 15/625,456, filed Jun. 16, 2017, which is a continuation of patent application Ser. No. 15/048,046, filed Feb. 19, 2016. The entire contents and disclosures of U.S. patent applications Ser. Nos. 15/625,456 and 15/048,046 are hereby incorporated herein by reference in their entireties.

BACKGROUND

This invention generally relates to personal navigation methods and systems, and more specifically, to creating routes for individuals based on image analysis and special needs of the individuals.

The majority of conventional computerized navigation systems are designed for directing vehicles from a source to a destination based on a start address and an end address. Such conventional systems can also recalculate a route based on dynamic information such as a missed turn. Other systems are available for hikers which provide a general direction of travel needed to reach an input destination. Other systems provide navigational assistance to pedestrians, and these systems generally identify a route for a pedestrian based on an estimated shortest time or distance to a destination. For example, many different types of global positioning system (GPS) based navigation systems are currently available.

These conventional systems have important disadvantages or limitations. For instance, personal navigation systems might not adequately take into account special needs of pedestrians, cyclists and people with disabilities to determine what would be the best route to take for that moment.

SUMMARY

Embodiments of the invention provide a method, system and computer program product for creating a route for a user based on satellite imagery analysis. In embodiments, the method comprises identifying a start location and a destination for the user; identifying defined needs of the user; obtaining satellite imagery of a specified area between the start location and the destination; analyzing the satellite imagery to identify defined local features affecting said defined needs of the user in the specified area; and selecting a route for the user, from the start location to the destination, based on said defined local features in the specified area.

In embodiments, the selecting a route includes identifying a plurality of candidate routes from the start location to the destination; generating a score for each of the candidate routes using the defined local features, and selecting one of the plurality of candidate routes based on the generated scores for the candidate routes.

In embodiments, the generating a score for each of the candidate routes includes identifying a group of variables based on the defined needs of the user, and using said group of variables to generate said score.

In embodiments, the analyzing the satellite imagery includes identifying a multitude of variable features in the satellite imagery, and prioritizing the variable features to analyze the satellite imagery through image recognition and extrapolation software.

In embodiments, the identifying a multitude of variable features includes assigning a weight to each of said variable features.

In embodiments, the user is walking from the start location to the destination, and the selected route is a best route for walking from the start location to the destination based on given criteria.

In embodiments, the user is riding a bicycle, and the defined needs of the user are due to the user riding the bicycle.

In embodiments, the user is in a wheelchair, and the defined needs of the user are due to the user being in the wheelchair.

In embodiments, the identifying the defined needs of the user includes the user inputting a specified condition of the user, and using the specified condition to determine the defined needs.

In embodiments, the analyzing the satellite imagery includes analyzing the satellite imagery for sidewalk width, sidewalk ramps, sidewalk obstacles, terrain, slope, lane width, traffic flow, street direction, and pedestrian crossing signals.

Embodiments of the invention generate a route based on image recognition for pedestrians, cyclists or wheelchairs, for example. The system uses several variables to determine the best route. Sidewalk width, sidewalk ramps, terrain of sidewalk and streets, estimated numbers of cars on the street and number of lanes of vehicular traffic are some of the variables that may be used. This information comes from analyzing the satellite images of a number of possible routes from the user's location to the requested destination.

Embodiments of the invention accomplish a number of tasks. For instance, embodiments of the invention display the best route based on image recognition and user definition of his or her special needs. Also, embodiments of the invention recalculate the route when the defined path has been changed by the user, and recalculate routes based on new satellite imaging.

A number of important advantages are achieved with embodiments of the invention. For example, a person with special needs, like a person on a wheelchair, can select the best route to his or her destination. This will help a person with special needs get the best route based on that person's specific needs. As another example, a cyclist will get the best route based on the most friendly environment for the cyclist's means of transportation. Also, a pedestrian will get the best route for walking purposes. The selection is not based on the route itself, but on the best sidewalks, parks and pedestrian crossing signals along the route.

DRAWINGS

DETAILED DESCRIPTION

Figure 1:
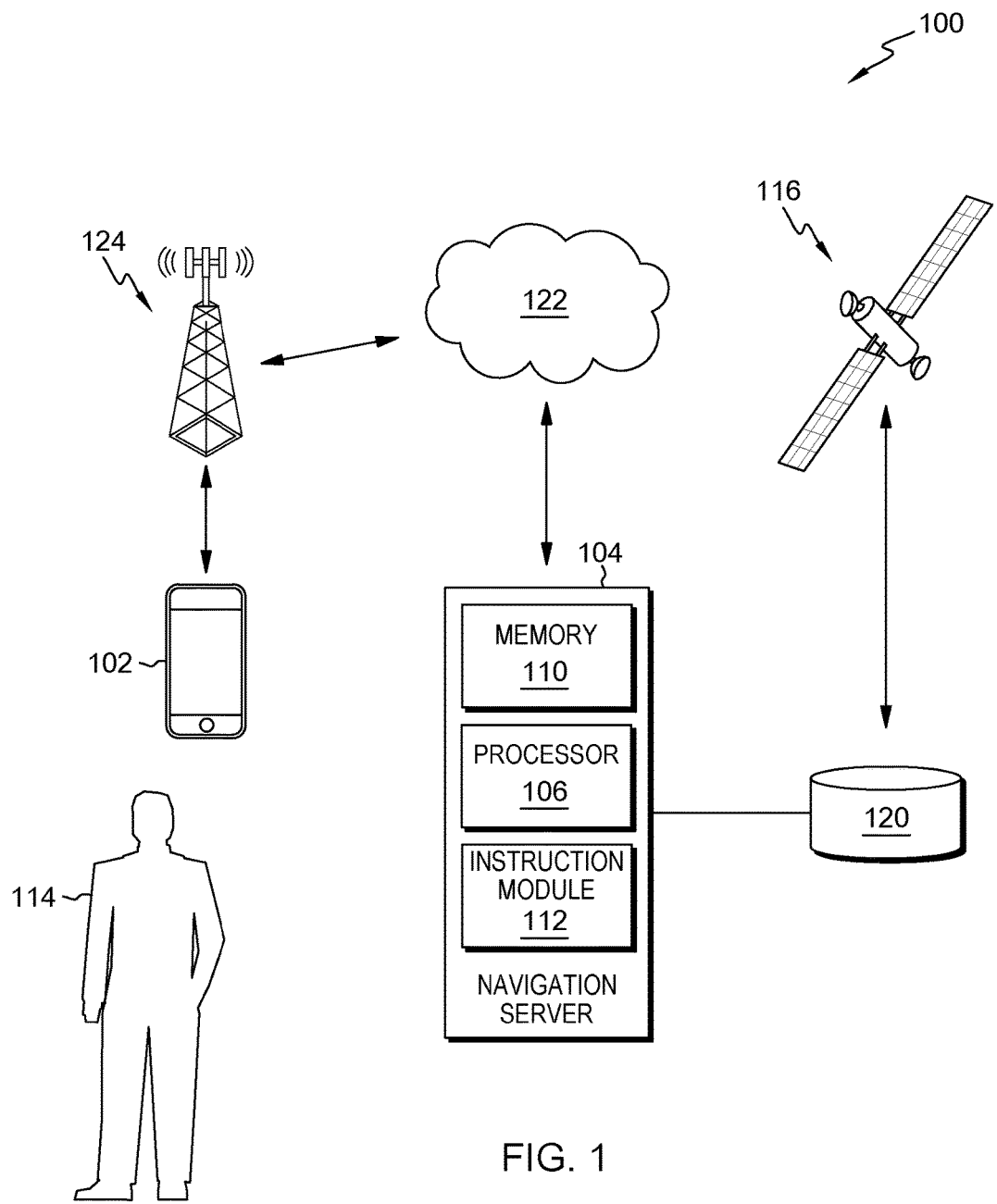
FIG. 1 is a schematic representation of a navigation system in accordance with an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention provide a personal navigation method and system that creates a route for a person using satellite imagery and based on special needs of that person. FIG. 1 illustrates a personal navigation system 100 in accordance with an embodiment of the invention. Generally, system 100 comprises a mobile user device 102 and navigation server 104. Navigation server 104, in turn, includes processor 106, memory 110 and instruction module 112. A person 114 that uses the navigation system is represented at 114; and FIG. 1 also shows a satellite 116 for obtaining satellite imagery, a data store 120 for storing the satellite imagery, a Wide Area Network (WAN) such as the Internet 122, and a cellular communications network 124.

Generally, mobile device 102 communicates with navigation server 104 over one or more wired and/or wireless networks. With the embodiment shown in FIG. 1, mobile device 102 communicates with navigation server via cellular network 124 and the Internet 122. Navigation server 104 receives user input from mobile device 102, determines or obtains a beginning location and an end location for user, and determines a number of possible routes from the beginning location to the end location. Server 104 also analyzes those routes using satellite imagery, and based on specified needs of the user and specified variables of the routes, and the server 104 selects one of the possible routes as a best route and communicates this selected best route to the user.

Any suitable mobile device 102 can be used in embodiments of the invention. Embodiments of the invention are well suited for use with portable mobile devices such as web-enabled cell phones, personal digital assistants (PDAs), hand held navigation devices, portable computers, and other suitable devices.

In some implementations, both voice and data communications can be established over the wireless network 124. For example, the mobile device can place and receive phone calls (e.g., using VoIP protocols), send and receive e-mail messages (e.g. using POPS protocol), and retrieve electronic documents and/or streams, such as web pages, photographs, and videos, over the wireless network and wide area network (e.g., using TCP/IP or UDP protocols). In some implementations, the mobile device can be physically directly connected to an access point of the Internet 122 using one or more cables. The access point can be a personal computer, and in this configuration, the mobile device can be referred to as a "tethered" device.

Navigation server 104 may be any suitable network device running any suitable operating system and configured to communicate over a network. As discussed above, the navigation server includes processor 106, memory 110 and instruction module 112. The processor is an arithmetic device, such as a central processing unit (CPU) or a micro processing unit (MPU), and executes programs stored in the memory. Furthermore, the processor controls functional sections of the navigation server. The memory 110 is a primary storage unit that holds data, including programs, required for the processor to operate. Instruction module 112 may be used to hold instructions for the processor.

The secondary storage device 120 is a non-volatile storage unit, such as a hard disk drive or a solid state drive (SSD). In the example of FIG. 1, the secondary storage device stores satellite image data obtained by satellite 116, and the storage device may store other data also. The secondary storage device 120 may be an external storage that is connected to server via a network.

As will be appreciated by those of ordinary skill in the art, embodiments of the invention are not limited to the specific structures shown in the drawings, and the structures discussed herein are only examples used to illustrate features of the disclosure.

Figure 2:
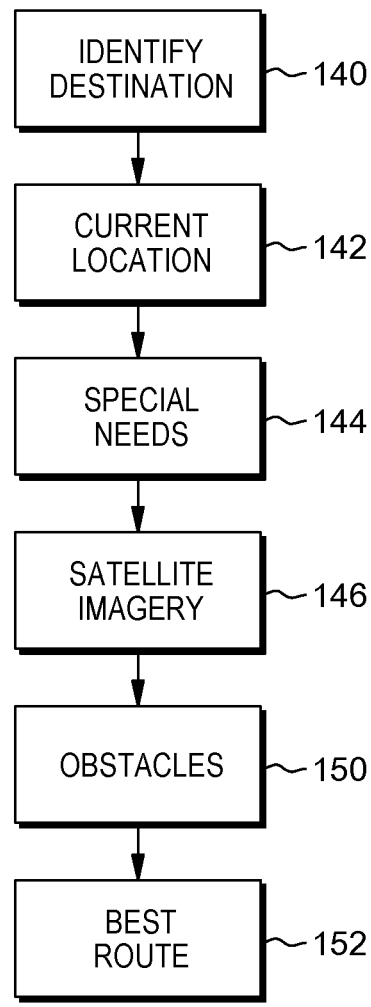
FIG. 2 is a flow diagram of an embodiment of the invention.

FIG. 2 illustrates an embodiment of the operation of system 100.

With reference to FIGS. 1 and 2, user 114 communicates with server 104 through user device 102 to input a request to the navigation server for directions. The user typically also inputs a desired destination 140 as the end location. The user may communicate with the mobile device 102 through a display/input (e.g., a graphic user interface that can include a screen, key pad, pointing device, speaker, microphone, or other input means). Also, a suitable location sensor or antenna may be incorporated with the device to obtain the starting point or current location 142 for the directions, or the starting point may be input by the user.

Special needs 144 of the user are input, determined or obtained. These special needs, for example, may be due to the user riding a bicycle or being in a wheelchair. These needs might be input by the user, or they may be obtained from a database. Also, the user might not input the special needs themselves, but might input a condition, such as the user riding a bicycle or being in a wheelchair, and processor 106 may use this condition as an index or a key to a database or table, or otherwise use the input condition, to identify the resulting special needs of the user.

Processor 106, using the special needs of the user, and using satellite imagery 146 from data store 120, identifies obstacles and obstructions 150 in various possible routes from the start location to the destination. Taking these obstacles and obstructions into account, the processor selects a best route 152 for the user and transmits that best route to the user device 102. The user device may output this selected route to the user through a display, print-out, or verbal instructions.

More specifically, at 146, satellite imagery of areas between the starting location and the user's destination is obtained from storage device 120. Any suitable procedure may be used to determine an area of interest and to request satellite imagery of that area.

At 150, obstacles and obstructions and other localized terrain or street level factors are identified from the satellite imagery. These obstacles may include sidewalk width, sidewalk ramps, terrain of sidewalks and streets, estimated number of cars on the street, and the number of traffic lanes. Any suitable map extrapolation procedure may be used to identify these features in or from the satellite imagery. Based on these identified features, processor determines a best route for the user.

Figure 3:
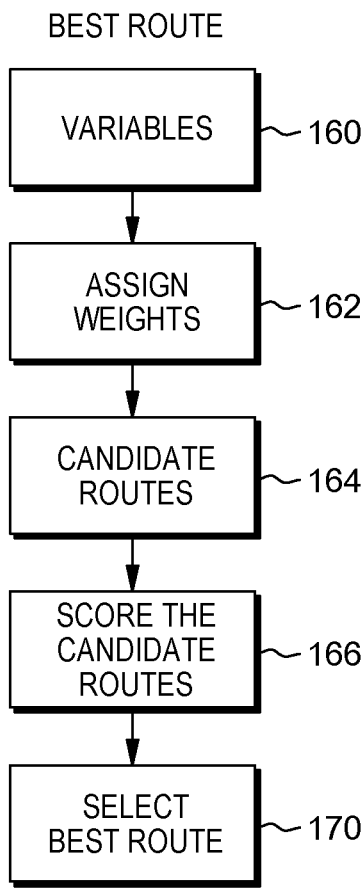
FIG. 3 illustrates an algorithm for identifying a best route for a person based on special needs.
Figure 4:
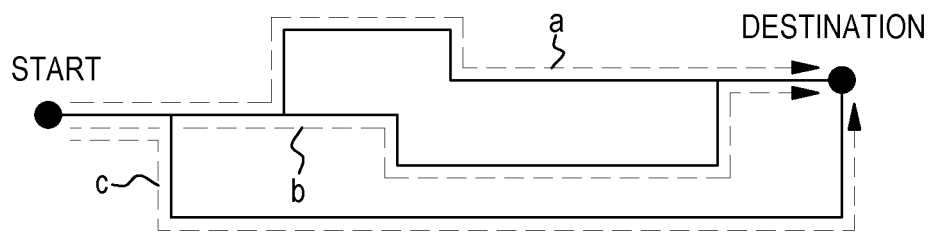
FIG. 4 shows a plurality of possible routes between a start location and a destination.

FIGS. 3 and 4 illustrate in more detail the procedure for determining this best route.

At 160, a group of variables are input, determined or identified based on the user's special needs. These variables may include, for example, sidewalk width, sidewalk ramps, sidewalk obstacles, terrain slope, lane width, traffic flow, street direction, pedestrian crossing signals, and others.

At 162, weights are assigned to these variables. These weights may be based on, for example, user input or other factors. Based on these weighted variables, processor selects a best route for the user.

In embodiments of the invention, at 164, a number of possible or candidate routes are identified. For instance, as illustrated in FIG. 4, one route from the start to the destination is along path a, a second route is along path b, and a third route is along path c. For each of these possible routes, a score is generated at 166 based on the above-mentioned weighted variables. Other factors may also be considered when generating these scores. The best route for the user may be selected at 170 based on the scores generated for the various possible routes.

As an example scenario, a user in a wheelchair is leaving his current location. The user uses mobile device 102 to access system 104 and enters his desired destination, and the user inputs that he has special needs and is on a wheelchair. The system 104 gets a satellite map with details between the user's current location and the destination point, and the system 104 uses image recognition software to analyze variables defined for people on wheelchairs. After analysis, system 104 traces the best route for the user in a wheelchair.

In this example, the navigation system performs a number of steps. The system uses GPS location software to determine the user's current location, and the system uses image recognition software and image extrapolation software to get all the data from the satellite imagery. The system checks for the special need for the user, if any, and the system uses several common variables and special variables based on the user's special needs to determine the best route for the user.

Each variable has a weight based on the user's special needs. Some of the variable may be, for example, sidewalk width, sidewalk ramps, sidewalk obstacles, terrain slope, land width, traffic flow, street direction, pedestrian crossing signals, and others. Sidewalk obstacles include, but are not limited to, vendor stands, holes in the sidewalk, benches on or alongside the sidewalk, steps, bus stops, and others. The system uses these variables in order of highest to lowest priority to analyze through image recognition and extrapolation software. Each analysis generates a score for all the possible routes, and the route with the best score is presented to the user.

As mentioned above, embodiments of the invention provide a number of important advantages. For instance, a person with special needs, like a person on a wheelchair, can select the best route to his or her destination. This will help a person with special needs get the best route based on that person's specific needs. As another example, a cyclist will get the best route based on the most friendly environment for the cyclist's means of transportation. In addition, a pedestrian will get the best route for walking purposes. The selection is not based on the route itself, but on the best sidewalks, parks and pedestrian crossing signals along the route.

Figure 5:
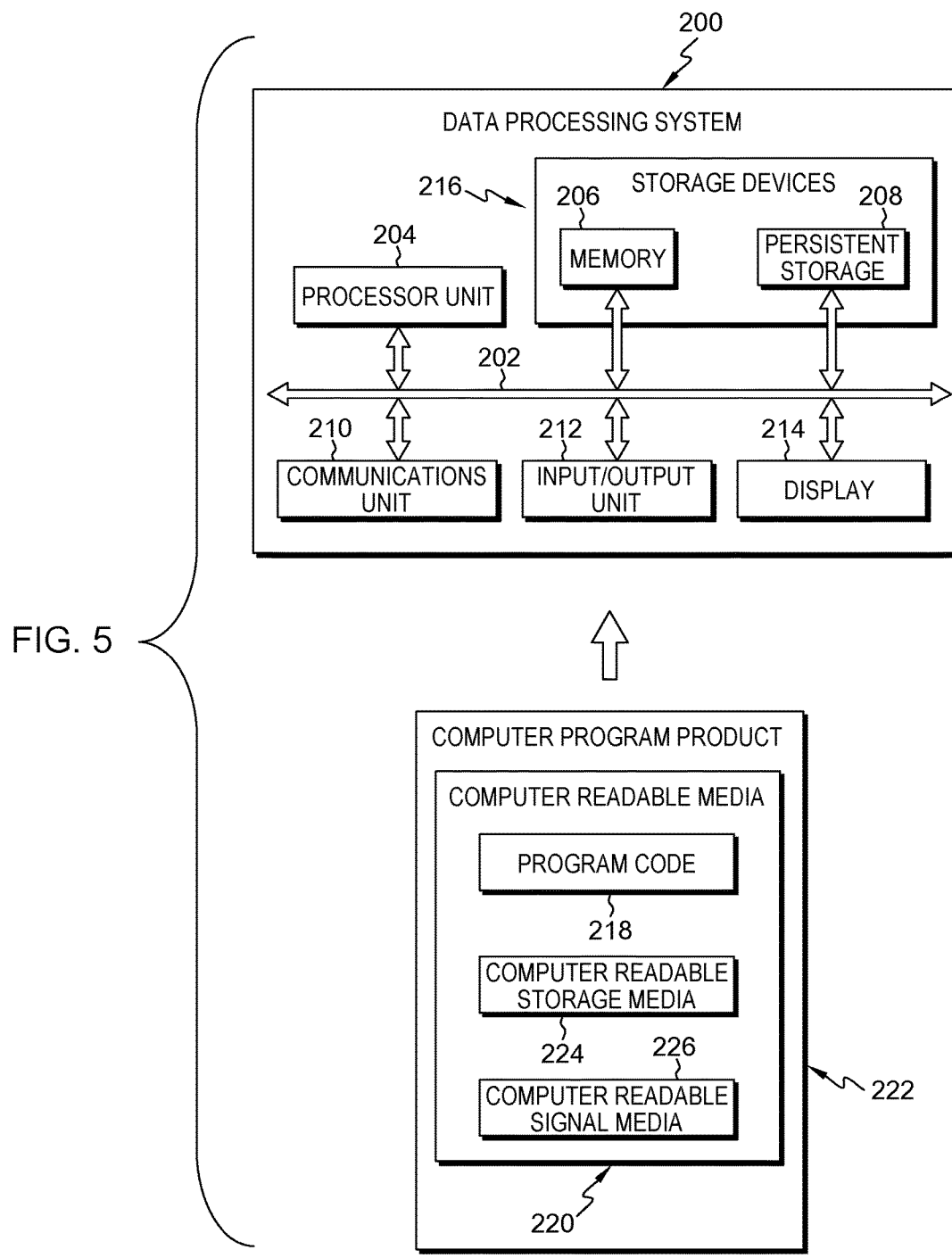
FIG. 5 shows a block diagram of a data processing system that may be used in embodiments of this invention.

FIG. 5 depicts a diagram of a data processing system in accordance with an illustrative embodiment. Data processing system 200 is an example of a computer, such as server or client, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of identifying a route for a user based on satellite imagery analysis, comprising:
   a user inputting into a mobile communications device an end location and an identification of a specified condition of the user, and sending the end location and the identification of the specified condition of the user to a navigation server, by a personal navigation system, via the mobile communications device, a cellular communications network and the Internet;
   the navigation server obtaining a current location of the user from the mobile communications device;
   the navigation server determining a plurality of candidate routes from the current location of the user to the end location;
   the navigation server obtaining satellite imagery of the candidate routes from a data store, and analyzing the candidate routes using the obtained satellite imagery obtained; and
   the navigation server, based on the specified condition of the user and specified variables of the candidate routes, selecting one of the candidate routes as a best route for the user to the end location, and transmitting said best route for the user to the mobile communications device.

2. The method according to claim 1, wherein the navigation server analyzing the candidate routes includes the navigation server determining an area of interest, and requesting from the data store satellite imagery of the area of interest.

3. The method according to claim 1, wherein the navigation server selecting one of the candidate routes as a best route includes the navigation server identifying specified features in the satellite imagery, and determining the best route based on the identified specified features in the satellite imagery.

4. The method according to claim 1, wherein:
   the user inputting into a mobile communications device an identification of a specified condition of the user includes the user inputting into the mobile communications device an identification of defined needs of the user; and
   the sending the identification of the specified condition of the user to a navigation server includes sending the identification of the defined needs of the user via the mobile communications device.

5. The method according to claim 4, wherein the navigation server selecting one of the candidate routes as a best route includes the navigation server identifying a group of variables based on the defined needs of the user.

6. The method according to claim 5, wherein the navigation server selecting one of the candidate routes as a best route further includes the navigation server assigning weights to the group of variables.

7. The method according to claim 1, wherein the navigation server selecting one of the candidate routes as a best route includes the navigation server using the specified condition as an index to a table to identify defined needs of the user.

8. The method according to claim 1, wherein the navigation server selecting one of the candidate routes as a best route includes the navigation server generating a score for each of the candidate routes.

9. The method according to claim 8, wherein the generating a score for each of the candidate routes includes:
   assigning weights to defined local features in the satellite imagery; and
   generating the score for each of the candidate routes based on the weights assigned to the defined features in the satellite imagery.

10. The method according to claim 8, wherein the navigation server selecting one of the candidate routes as a best route further includes selecting one of the plurality of candidate routes as the best route based on the generated scores for the candidate routes.

11. A navigation system for identifying a route for a user based on satellite imagery analysis, comprising:
   a navigation server including a memory for holding data and program instructions; and one or more processor units connected to the memory for transmitting data to and receiving data from the memory: and a mobile communications device for receiving input from a user identifying an end location and a specified condition of the user, and for sending the identification of end location and the specified condition of the user to the navigation server via a cellular communications network and the Internet; and wherein said one or more processing units of the navigation server are configured for:

obtaining a current location of the user from the mobile communications device;

determining a plurality of candidate routes from the current location of the user to the end location;

obtaining satellite imagery of the candidate routes from a data store, and analyzing the candidate routes using the obtained satellite imagery obtained form a data store; and based on the specified condition of the user and specified variables of the candidate routes, selecting one of the candidate routes as a best route for the user to the end location, and transmitting said best route for the user to the mobile communications device.

12. The navigation system according to claim 11, wherein the analyzing the candidate routes includes determining an area of interest, and requesting from the data store satellite imagery of the area of interest.

13. The navigation system according to claim 11, wherein the selecting one of the candidate routes as a best route includes:

identifying specified features in the satellite imagery, and determining the best route based on the identified specified features in the satellite imagery.

14. The navigation system according to claim 11, wherein:

the receiving input from the user includes receiving input from the user identifying defined needs of the user; and the sending the identification of the specified condition of the user to the navigation server includes sending the identification of the defined needs of the user to the navigation server.

15. The navigation system according to claim 14, wherein the selecting one of the candidate routes as a best route includes identifying a group of variables based on the defined needs of the user.

16. A computer readable program product comprising:

a computer readable hardware medium having computer program code tangibly embodied therein for identifying a route for a user based on satellite imagery analysis, the computer program code, when executed in a computer system, performing the following:

receiving input from a user identifying an end location and a specified condition of the user, and sending the identification of end location and the specified condition of the user from a mobile communications device to a navigation server, of a personal navigation system, via a cellular communications network and the Internet;

obtaining, at the navigation server, a current location of the user from the mobile communications device;

determining, by the navigation server, a plurality of candidate routes from the current location of the user to the end location;

obtaining, by the navigation server, satellite imagery of the candidate routes from a data store, and analyzing, by the navigation server, the candidate routes using the obtained satellite imagery; and based on the specified condition of the user and specified variables of the candidate routes, selecting, by the navigation server, one of the candidate routes as a best route for the user to the end location, and transmitting said best route for the user to the end location to the mobile communications device.

17. The computer readable program product according to claim 16, wherein the analyzing the candidate routes includes determining an area of interest, and requesting from the data store satellite imagery of the area of interest.

18. The computer readable program product according to claim 16, wherein the selecting one of the candidate routes as a best route includes:

identifying specified features in the satellite imagery, and determining the best route based on the identified specified features in the satellite imagery.

19. The computer readable program product according to claim 16, wherein:

the receiving input from the user includes receiving input from the user identifying defined needs of the user; and the sending the identification of the specified condition of the user to the navigation server includes sending the identification of the defined needs of the user to the navigation server.

20. The computer readable program product according to claim 19, wherein the selecting one of the candidate routes as a best route includes identifying a group of variables based on the defined needs of the user.

\* \* \* \* \*